United States Patent [19]
Leighton

[11] Patent Number: 5,664,018
[45] Date of Patent: Sep. 2, 1997

[54] WATERMARKING PROCESS RESILIENT TO COLLUSION ATTACKS

[76] Inventor: Frank Thomson Leighton, 15 Charlesden Park, Newtonville, Mass. 02160

[21] Appl. No.: 615,534

[22] Filed: Mar. 12, 1996

[51] Int. Cl.$^6$ .................................. G09C 5/00; H04L 9/00
[52] U.S. Cl. .................................. 380/54; 380/3; 380/4; 380/23; 380/55; 283/73; 283/113; 283/17
[58] Field of Search ......................... 380/3, 4, 23, 49, 380/51, 54, 55, 59; 283/113, 72, 73, 74, 85, 93, 57, 58, 59, 901, 902, 17

[56] References Cited

U.S. PATENT DOCUMENTS

| | | |
|---|---|---|
| 4,939,515 | 7/1990 | Adelson . |
| 5,010,405 | 4/1991 | Schreiber et al. . |
| 5,488,664 | 1/1996 | Shamir ........................... 380/54 |
| 5,530,759 | 6/1996 | Braudaway et al. ........... 380/54 |

FOREIGN PATENT DOCUMENTS

| | | |
|---|---|---|
| 8908915 | 9/1989 | WIPO . |
| 95154289 | 5/1995 | WIPO . |

OTHER PUBLICATIONS

Bender, et al, "Techniques for Data Hiding," SPIE, vol. 2420, Feb. 1995, pp. 164–173.

Boneh and Shaw, "Collusion-secure fingerprinting for digital data," Advances in Cryptology, Proceedings of Crypto 95, Springer–Verlag (distributed on an exclusive basis at the Aug. 1995 Crypto meeting), pp. 452–465.

Brassil et al, "Electronic marking and identification techniques to discourage copying," Proceedings of Infocom 94, pp. 1278–1287, 1994.

Braudaway et al, IBM Research Report RC 20336 (89918), Jan. 15, 1996.

Caronni, "Assuring ownership rights for digital images," Proceedings of Reliable IT Systems VIS 95, Vieweg Publishing Company, Germany, 1995.

Choudhury et al, "Copyright protection for electronic publishing over computer networks," submitted to IEEE Network Magazine, Jun. 1994.

Cox et al, "Secure Spread Spectrum Watermarking for Multimedia," NEC Technical Report, 1995.

Macq and Quisquater, "Cryptology for Digital TV Broadcasting," Proc. of the IEEE, 83(6):944–957, Jun. 1995.

Matsui and Tanaka, "Video stenography," Proceedings IMA Intellectual Property Project, vol. I, pp.187–206, 1994.

Tanaka, et al, "Embedding secret information into a dithered multi-level image," Proc. 1990 IEEE Military Communications Conference, pp. 216–220, 1990.

van Schyndel et al, "A digital watermark," Proc. Int. Conf. on Image Processing, vol. 2, pp. 86–90, IEEE, 1994.

*Primary Examiner*—Bernarr E. Gregory
*Attorney, Agent, or Firm*—David H. Judson

[57] ABSTRACT

A watermarking procedure wherein each of a set of copies of the work has a slightly-modified form of a "baseline" watermark that is placed within a critical region of the data. The slight variations in the watermarks, however, are not perceptually visible and do not interfere with the work. If multiple persons collude to attempt to create an "illicit" copy of the work (i.e., a copy without a watermark), however, at least one of the modified watermarks is present in the copy, thereby identifying both the illicit copy and the copier.

17 Claims, 1 Drawing Sheet

WATERMARKING PROCESS RESILIENT TO COLLUSION ATTACKS

TECHNICAL FIELD

The present invention relates generally to preventing unlawful copying of audio, video and other media that can be digitized and, more particularly, to improved watermarking techniques that are robust even against multiple individuals who conspire together with independent copies.

BACKGROUND OF THE INVENTION

The proliferation of digitized media (audio, image and video) and the ease with which digital files can be copied has created a need for copyright enforcement schemes. Conventional cryptographic systems permit only valid keyholders access to encrypted data, but once such data is decrypted there is no way to track its reproduction or retransmission. Such schemes thus provide insufficient protection against unauthorized reproduction of information. It is known in the prior art to provide a so-called digital "watermark" on a document to address this problem. A "watermark" is a visible or preferably invisible identification code that is permanently embedded in the data and thus remains present within the data after any decryption process. One example of a digital watermark would be a visible "seal" placed over an image to identify the copyright owner. However, the watermark might also contain additional information, including the identity of the purchaser of a particular copy of the material.

Many schemes have been proposed for watermarking digital data. In a known watermarking procedure, each copy of a document D is varied slightly so as to look the same to the user but also so as to include the identity of the purchaser. The watermark consists of the variations that are unique to each copy. The idea behind such schemes is that the watermark should be hard to remove without destroying the document. Thus, a copy of a watermarked document should be traceable back to the specific version of the original from which it was created.

Although many prior art schemes claim to possess the "unremovable" property, all existing schemes are easily defeated by the following type of attack. Assume the attacker obtains two copies of the document that is being protected by the watermarking scheme. Each copy may have a different watermark, neither of which is supposed to be removable. The attacker now makes a third version of the document (which he hopes will not have a traceable watermark) by averaging his two copies. For a pictorial document, for example, each pixel of the third version would be the average of the corresponding pixels in the watermarked copies.

Using existing approaches to watermarking, the third copy of the document produced by the attacker will look like the original versions but the watermark will be destroyed. This is because the "average" of two watermarks does not carry sufficient information to be tied to either of the watermarks individually. Thus, the watermarking scheme can be rendered ineffective by simply averaging two copies of the document.

There is thus a need to devise a watermarking scheme that is immune to these and other such attacks, especially those in which the adversary obtains multiple copies of the original document.

BRIEF SUMMARY OF THE INVENTION

It is the principal object of the invention to describe a digital watermarking scheme wherein the watermark is robust against collusion by multiple individuals who each possess a watermarked copy of the data.

It is another object to describe such a scheme wherein the watermark cannot be removed by an adversary who obtains multiple copies of the original work.

It is a more general object of the invention to describe a watermarking method that is secure against any form of attack including, without limitation, averaging attacks.

It is still a further object of the invention to describe a watermarking procedure wherein each of a set of copies of the work has a slightly-modified form of a "baseline" watermark that is placed within a critical region of the data. The slight variations in the watermarks, however, are not perceptually visible and do not interfere with the works. If multiple persons collude to attempt to create an "illicit" copy of the work (i.e., a copy without a watermark), however, at least one of the modified watermarks is present in the copy, thereby identifying both the illicit copy and the copier.

It is still thus another object to describe a watermarking scheme of the type recited above wherein combining copies of the same data set does not destroy the watermark.

It is a further object of the invention to describe such a watermarking scheme that may be used to identify one or more of the parties who are colluding to destroy the watermark.

It is another more general object of the invention to describe a digital watermarking process that may be used as evidence in a Court because it is robust against collusion.

According to the preferred embodiment of the invention, the work to be protected is digitized into a data file or string of data. A first digital watermark is then inserted in a first copy of the data file, preferably in a critical region of the data. A "critical" region may consist of the entire document or alternatively will be some valuable portion of the work that will end up being significantly corrupted if the watermark is corrupted. A second digital watermark is then inserted in a second copy of the data file in a similar manner, and the process is repeated for additional copies. According to the invention, the first and second digital watermarks are slight variations of a "baseline" watermark, which is kept secret, and one cannot perceive any differences between the first and second copies due to these variations. The baseline watermark may be a digital string that is part of the original data being protected. Preferably, the variations are "randomized" in such a manner that if two persons were to collude to attempt to create an "illicit" copy of the work (i.e., a copy without a watermark), at least one of the first or second watermarks would still be present in the copy. After the watermark is inserted into the work, the work can be converted back to its original form.

Thus, the scheme ensures that different possessors of watermarked copies of a work cannot create a "clean" copy that does not include at least one of the slightly-modified watermarks. Indeed, by comparing the watermark of the illicit copy with the baseline watermark, one can determine the identity of the forger. Although not meant to be limiting, preferably the "variations" are generated using a "random" offset, and in particular a "normal distribution."

BRIEF DESCRIPTION OF THE DRAWINGS

For a more complete understanding of the present invention and the advantages thereof, reference should be made to the following Detailed Description taken in connection, with the accompanying drawings in which.

DETAILED DESCRIPTION

Figure 1:
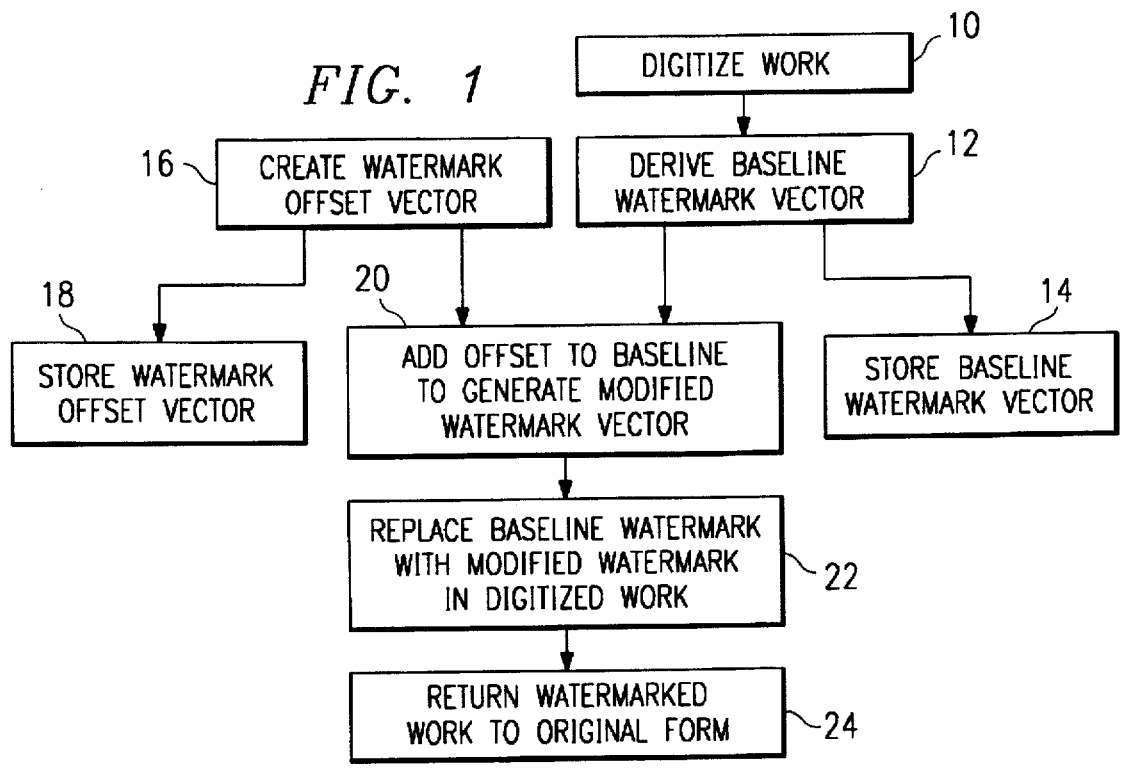
FIG. 1 is a block diagram illustrating the method of inserting a digital watermark into a copy.

According to the invention, the work to be protected may be an image (photographs and graphics), video and/or audio (speech and music). The particular type of work is not relevant to the invention. Referring now to FIG. 1, the work, in whatever form, is digitized at step 10 into a data file or string of data either as part of the inventive technique or through some known A/D preprocessing. In the invention, there is a "baseline" watermark that is preferably stored and not used in making a particular copy of the work (although this step is not necessarily required). This baseline watermark is then processed to create a set of one or more "modified" watermarks, each of which is related to the baseline watermark in a predetermined manner. Preferably, the "offsets" needed to create the modified watermarks are not fixed, however, but are "randomized." In this way, a very small amount of "noise" is added to the offsets that does not alter the perception of the watermarked copies but still ensures that possessors of such copies cannot collude to remove all existence of the watermark in at least one illicit copy.

In general, collusion-type attacks are prevented according to the invention by constructing a watermark using randomness in a specific way. Preferably, an n-length digital string: $x_1, x_2, \ldots, x_n$ is derived at step 12 from the data to be watermarked and stored at step 14 for future reference. This may be referred to as the "baseline" watermark. The string is preferably "critical" to the data in that corruption of the string will corrupt the data in a way that can be perceived and which will deminish the value of the corrupted document. Generation of the baseline watermark can be achieved in many ways, e.g., by digitizing some portion of the document and using the resulting data or some subset thereof. (Whatever method is used is also used in the verification process, as discussed below). An n-length watermark vector $w_1, w_2, \ldots, w_n$, is then created at step 16 and stored at step 18 for future reference. The vector is preferably created by choosing each $w_i$ from a specified random distribution (preferably the normal distribution). The random distribution used for each $w_i$ may or may not be the same (e.g., depending on whether it is desired to embed some specific serial number data in the watermark). The watermark vector is then added at step 20 to the string $x_1', x_2', \ldots, x_n'$, and the result reinserted at step 22 into the original data to be protected. The work may then be converted back to its original form (image, video, audio, etc.) at step 24.

Figure 2:
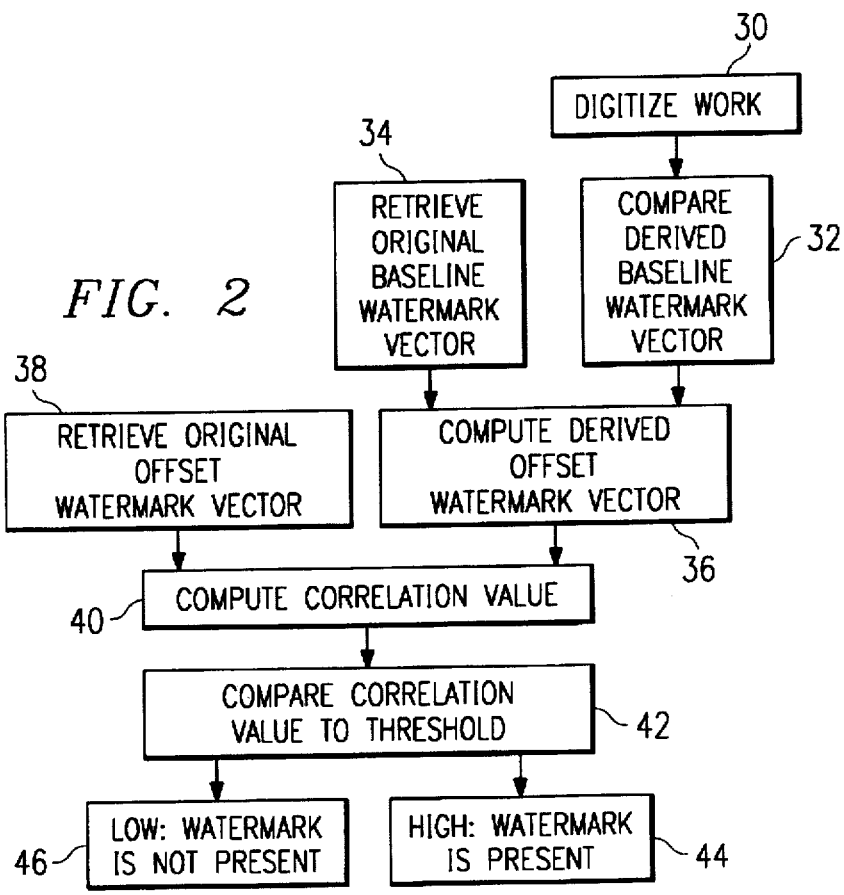
FIG. 2 is a block diagram illustrating the method for retrieving a digital watermark from a copy and correlating the retrieved watermark with a stored watermark.

Assume it is now desired to retrieve the watermark from a copy D'. This can be accomplished, as shown generally in FIG. 2, by digitizing the copy D' at step 30 and then computing at step 32 the derived values $x_1', x_2', \ldots x_n'$, using the same algorithm used to compute the baseline watermark. Then, the method proceeds at step 34 by retrieving the original base line watermark, $x_1, x_2, \ldots x_n$, from memory and subtracting out $x_1, x_2, \ldots x_n$ from $x_1', x_2', \ldots x_n'$ to compute a derived watermark $w_1', w_2', \ldots w_n'$ at step 36. A correlation value (preferably an inner product) is then calculated between the derived watermark and $w_1, w_2, \ldots w_n$, retrieved at step 38, to produce a correlation value at step 40. The correlation value is compared at step 42 to threshold levels, and if the correlation is high (step 44), then there is a match and a watermark is present. If the correlation is low (step 46), the watermark is not present. (The inner product scheme works by computing the absolute value of the sum $w_1 w_1' + \ldots + w_n w_n'$).

This scheme is immune to collusion because the watermark is random and because different watermarks are completely uncorrelated. In existing schemes, different watermarks are highly correlated and so it is easy for an attacker to exploit the correlation to destroy the watermark (e.g., by an averaging attack). In the invention method, there is simply not enough information contained in "t" different watermarked copies of the data in order for the adversary to remove the watermark. More specifically, if the attacker obtains "t" copies of watermarked data using the normal distribution to construct the watermarks (with watermarks $w_{11}, \ldots, w_{1n}$, through $w_{t1}, \ldots, w_{tn}$), it will appear to the attacker as if the original baseline watermark is $x_1 + (w_{11} + \ldots + w_{1n})/t, \ldots, x_n + (w_{t1} + \ldots + w_{tn})/t$, which is not the true baseline watermark $x_1, \ldots x_n$. The distinction is important since the former string is correlated with each of the watermarks $w_{11} \ldots w_{1n}$ through $w_{t1} \ldots w_{tn}$. In other words, the attacker simply does not have enough information in order to evade the watermark, no matter what sort of attack is used. Hence, one can prove that either the attacker must destroy the data or he must leave a trace of at least one of the component watermarks which will be revealed when the correlation test is run. Only someone with knowledge of the original baseline watermark could remove the watermark without detection.

Therefore, "m" copies of the work include variations of a baseline watermark such that up to "t" persons who possess those copies cannot collude to create a "clean" copy (i.e., one without any watermark whatsoever). Stated another way, any "t" persons who collude in such a manner will always create an illicit copy that includes one of the modified watermarks. Comparison of the watermark of the illicit copy with the baseline watermark then identifies what party made the copy (assuming there is a record of which party originally got which "version").

According to a preferred method, a first digital watermark is inserted in a first copy of a data file, preferably in a critical region of the data. A second digital watermark is then inserted in a second copy of the data file in a similar manner, and the process is repeated for additional copies. As discussed above, the first and second digital watermarks are slight variations of a "baseline" watermark, which is kept secret, and one cannot perceive any differences between the first and second copies due to these variations. Preferably, the variations are "randomized" in such a manner that if two persons were to collude to attempt to create an "illicit" copy of the work (i.e., a copy without a watermark), at least one of the first or second watermarks would still be present in the copy. In the preferred embodiment, a watermark consists of a sequence of real numbers $W = w_1, \ldots, w_n$, where each value $w_i$ is chosen independently according to $N(0,1)$ (where $N(\mu, \sigma^2)$ denotes a normal distribution with mean $\mu$ and variance $\sigma^2$). The watermark may consist of a number (e.g., 1000) of randomly generated numbers with a normal distribution having zero mean and unity variance. Alternatively, $w_i$ could be selected according to $N(\mu_i, \sigma_i)$ where $\mu_1, \ldots, \mu_n$ can be a serial number corresponding to the copy being watermarked (or other information that may be embedded).

In order to detect the presence of a watermark W in a derived watermark signal W', we preferably use a correlation function $cor(W, W') = |W \cdot W'|$, which is the inner product of two vectors. If W were selected according to the normal $N(0,1)$ distribution and W' is uncorrelated to W (but of the same order), then the correlation will be small (about $\sqrt{n}$). If W' is closely correlated to W, then the correlation will be large (about n). If W' is uncorrelated to W but is of a larger order (e.g., due to intentional or unintentional noise or attempts to hide the watermark), then the correlation might also be large. (Specifically, if W' is uncorrelated to W but has B times the magnitude, then the correlation is about B $\sqrt{n}$. If B is large, then the data D' will not resemble D. (The notion of large in this context depends on the application and the level of security/clarity desired). In any event, the watermark is said to be present if cor(W,W')<c $\sqrt{n}$, where c is a predetermined constant that depends on the application and level of security desired (e.g., c=4).

The correlation will be low if the watermark is not present and the work is not destroyed. The correlation will be high if D' was derived from the watermarked document or if the data has been corrupted beyond recognition (the latter condition being determined by inspection).

As noted above, it is preferable that each of the "modified" watermarks be placed in a critical region of the data. Of course, the exact location will depend on the nature of the work being protected. It is also helpful if every entry in this region of data is largely uncorrelated with the other data. It has been suggested (by Cox et al) that this can be accomplished by embedding a watermark in the spectrum of an image, the temporal frequency domain of an audio signal, or the spatio-temporal frequency domain of a video sequence. Although the above techniques are preferred, one may even encode the watermark in other less, desirable places (such as in the low order or least significant bits) of the data and still obtain the advantages of the collusion-resistant feature of the invention where multiple parties may collude to remove the watermark.

I claim:

1. A watermarking method, comprising the steps of:
   (a) generating a digital string from the work to form a baseline watermark;
   (b) generating a set of watermarks each having a predetermined relationship to the baseline watermark; and
   (c) inserting a respective one of the set of watermarks into a respective copy of the work to create a watermarked copy uniquely identified by the respective one of the set of watermarks; and
   (d) repeating step (c) at least m times to create a set of m watermarked copied, each having a different one of the set of watermarks therein, such that if a subset of said m watermarked copies are averaged to produce an illicit copy of the work, at least one of the set of watermarks is detectable in the illicit copy.

2. The method as described in claim 1 wherein the predetermined relationship is a set of random offsets.

3. The method as described in claim 2 wherein the random offsets have a normal distribution having zero mean and unity variance.

4. The method as described in claim 1 wherein the work includes an image.

5. The method as described in claim 1 wherein the work includes an audio signal.

6. The method as described in claim 1 wherein the work includes a video signal.

7. The method as described in claim 1 wherein each of the watermarks is inserted in a critical region of the digital data file.

8. The method as described in claim 1 further including the step of comparing the watermark in the illicit copy with the baseline watermark to determine which possessor of a copy of the work created the illicit copy.

9. A method of securing e work against copying, comprising the steps of:
   (a) generating a set of watermarks each comprising a vector of randomly-generated numbers; and
   (b) inserting a respective one of the set of watermarks into a respective copy of the work to create a watermarked copy uniquely identified by the respective one of the set of watermarks; and
   (c) repeating step (b) at least m times to create a set of m watermarked copies, each having a different one of the set of watermarks therein, such that if a subset of said m watermarked copies are averaged to produce an illicit copy of the work, at least one of the set of watermarks is detectable in the illicit copy.

10. The method as described in claim 9 wherein the work includes an image.

11. The method as described in claim 9 wherein the work includes an audio signal.

12. The method as described in claim 9 wherein the work includes a video signal.

13. The method as described in claim 9 further including the step of comprising the watermark in the illicit copy with the set of watermarks to determine which possessor of a copy of the work created the illicit copy.

14. A method of protecting a work against illicit copying, comprising the steps of:
   (a) generating a set of watermarks each having a predetermined relationship to a first watermark for the work; and
   (b) inserting a respective one of the set of watermarks into a respective copy of the work to create a watermarked copy uniquely identified by the respective one of the set of watermarks; and
   (c) repeating step (b) at least m times to create a set of m watermarked copies, each having a different one of the set of watermarks therein, wherein averaging a pair of said m watermarked copies generates a copy of the work in which at least one of the set of watermarks can be detected.

15. The method as described in claim 14 wherein the first watermark is derived from the work.

16. A method of generating secure copies of a document, comprising the steps of:
   (a) generating a set of watermarks each comprising a vector of randomly-generated numbers with a normal distribution having zero means and unity variance;
   (b) inserting a respective one of the set of watermarks into a respective copy of the document to create a watermarked copy uniquely identified by the respective one of the set of watermarks; and
   (c) repeating step (b) at least m times to create a set of m watermarked copies of the document that the secure against illicit copying.

17. A method of generating secure copies of a document, comprising the steps of:
   (a) generating a set of watermarks each comprising a vector of randomly-generated numbers;
   (b) inserting a respective one of the set of watermarks into a respective copy of the document to create a watermarked copy uniquely identified by the respective one of the set vectors; and
   (c) repeating step (b) at least m times to create a set of m watermarked copies of the document that are secure against illicit copying.

* * * * *